J. W. BARCUS.
AEROPLANE.
APPLICATION FILED SEPT. 7, 1915.

1,215,466.

Patented Feb. 13, 1917.
4 SHEETS—SHEET 3.

WITNESSES

INVENTOR
John William Barcus,
BY
ATTORNEY

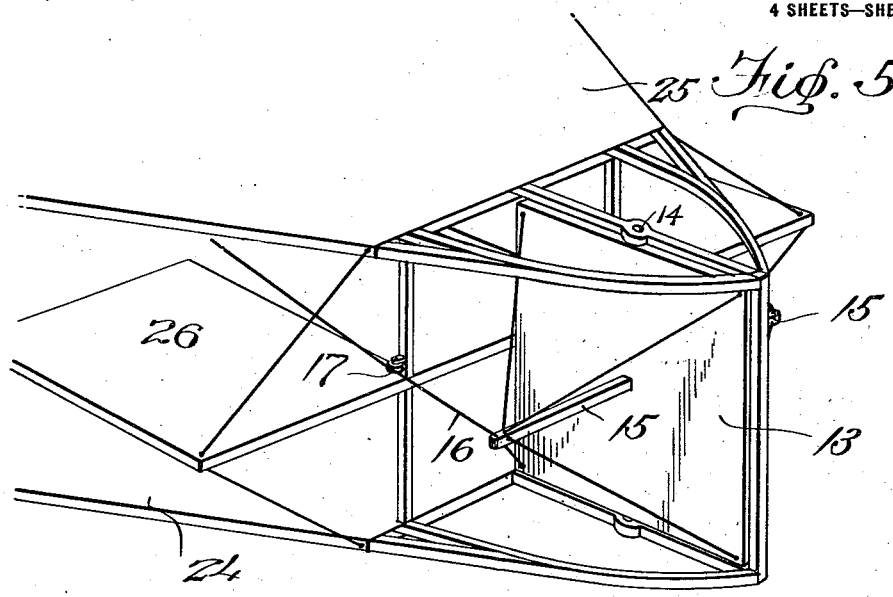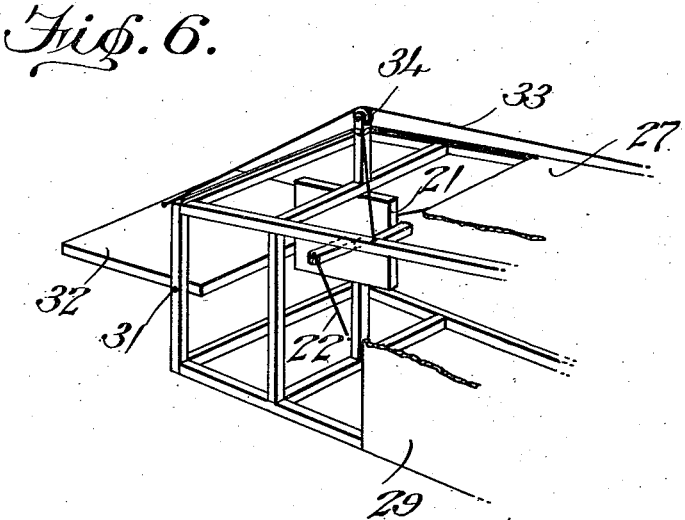

UNITED STATES PATENT OFFICE.

JOHN WILLIAM BARCUS, OF BALTIMORE, MARYLAND.

AEROPLANE.

1,215,466. Specification of Letters Patent. Patented Feb. 13, 1917.

Application filed September 7, 1915. Serial No. 49,305.

*To all whom it may concern:*

Be it known that I, JOHN WILLIAM BARCUS, a citizen of the United States, residing at Baltimore city and State of Maryland, have invented certain new and useful Improvements in Aeroplanes, of which the following is a specification.

My invention relates to that type of dynamic flying machine termed an aeroplane, wherein support of the machine in the air is obtained by the resistance accruing from the fact that the machine is power driven through the air.

It is one object of the present invention to provide an aeroplane of the monoplane or biplane type which has the laterally extending supporting wings so arranged and inclined that the machine will leave the ground with a comparatively short preliminary run, and only requires practically the same power to start as it does to maintain the areoplane in flight. Thus the difficulty with the usual construction of aeroplane, wherein a greater output of power is required to start than to maintain flight, is eliminated.

It has been determined that, for the purpose of maintaining longitudinal stability during flight, forward controls are inefficient probably due to the fact that considerable leverage is required to give the requisite up-and-down movements for shifting the elevation. Therefore another object of my invention resides in providing a machine with a rear controller and having inherent longitudinal stability during flight.

A further object consists in providing a frame having bowed top and bottom portions with supporting planes located fore and aft, which construction, gives the advantage of what is termed in the art "following surface" wherein, when a gust of wind strikes the first plane the tilt of the machine is compensated for by the increased resistance when the same strikes the edge of the rear plane.

A further object is to provide vertical planes aft of the machine to preserve lateral stability.

And yet another object resides in providing simultaneously operated front and rear vertically positioned control planes which are simultaneously operable to vary and control the lateral direction of flight.

A still further object consists in providing a greater area of supporting surfaces at the fore end of the machine than at the aft end.

With the above and other objects in view, I will now proceed to describe the specific embodiment of my invention illustrated in the accompanying drawings forming a part of this specification, and in which:

Fig. 5 is a perspective view of the forward portion of the aeroplane, showing the forwardly positioned vertical plane for controlling the lateral direction of flight and, Fig. 6 is a perspective view of the rear portion of the aeroplane showing the rear control or levering means and the smaller vertical plane for assisting in controlling the lateral direction of flight.

Figure 1:
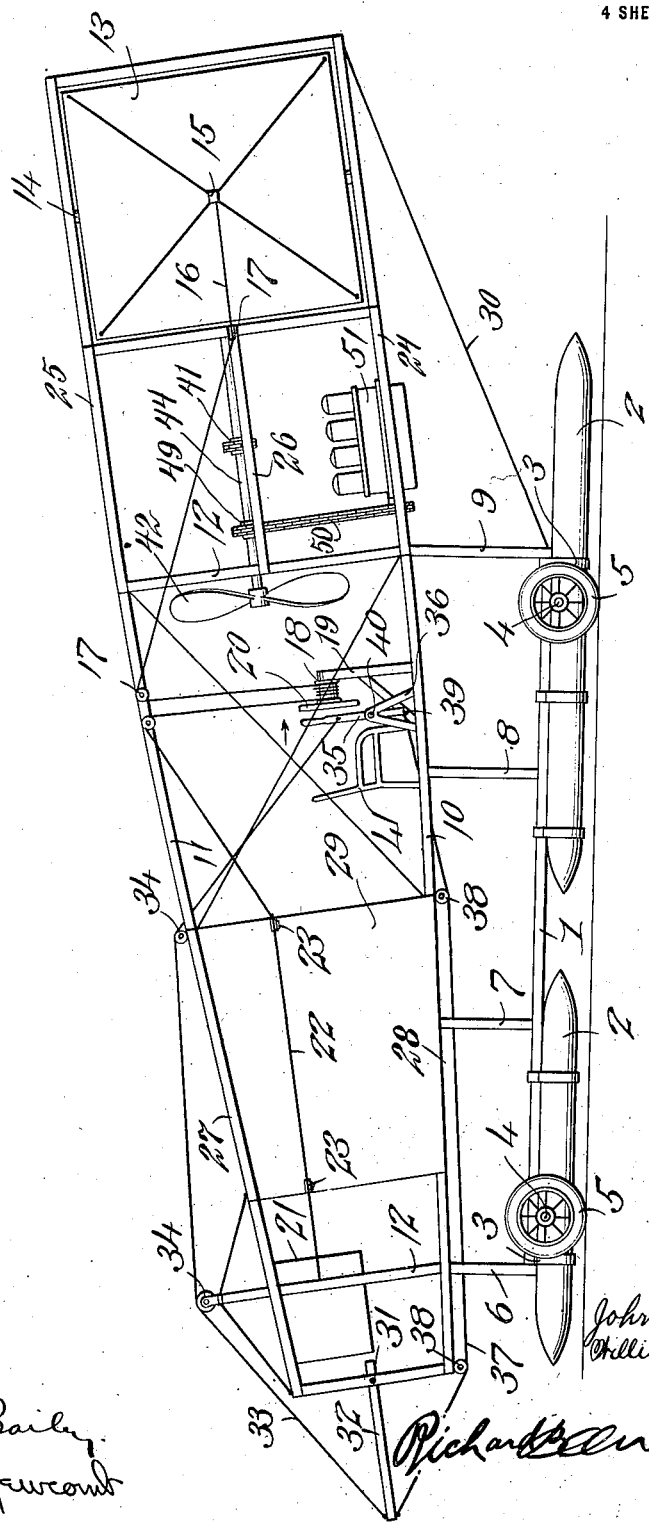
Figure 1 is a side elevation of an aeroplane constructed according to the principles of my invention.
Figure 2:
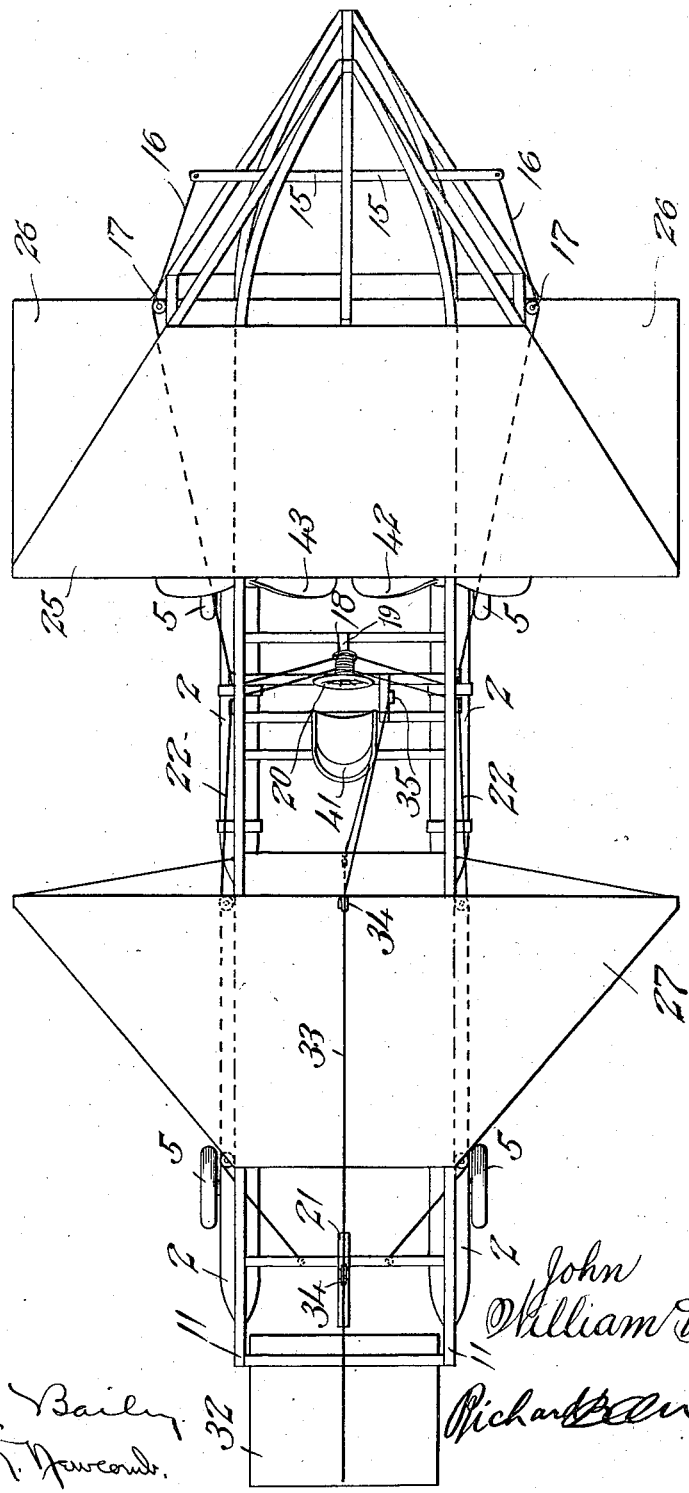
Fig. 2 is a top plan view of the same.
Figure 3:
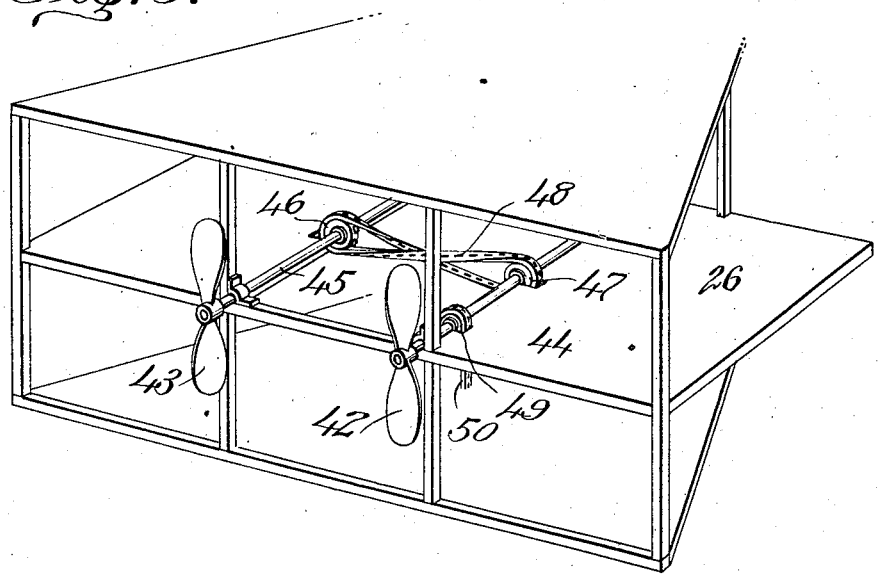
Fig. 3 is a perspective view looking forward from immediately behind the forward supporting planes and showing the two propellers adapted to be driven in opposite directions.
Figure 4:
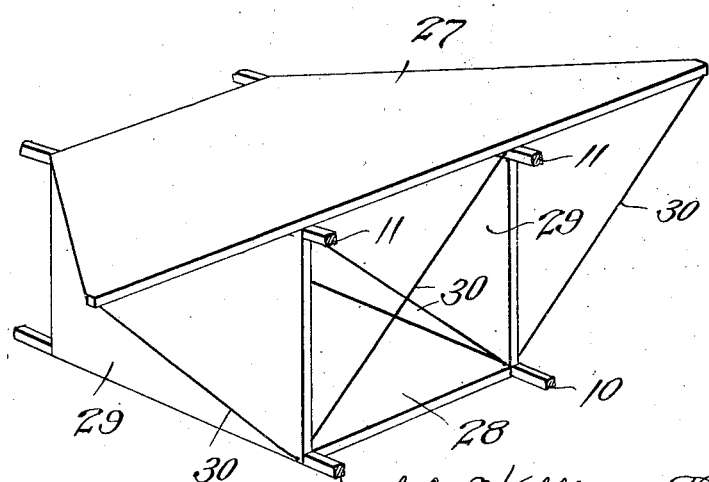
Fig. 4 is a fragmentary perspective view of the rear portion of the aeroplane.

In detail:

The aeroplane, as shown, comprises the lower framework consisting of the horizontal members 1 carrying pontoons 2 secured thereto by means of stays 3. Also the horizontal members 1 carry axles 4 having journaled thereon the pneumatically tired wheels 5. The horizontal members 1 are provided with uprights 6, 7, 8 and 9 on each side which gradually increase in height toward the forward end of the aeroplane.

The said uprights 6, 7, 8 and 9 carry the longitudinally extending bowed frame members 10 and similarly bowed longitudinally extending top frame members 11 are also provided; said frame members 11 are supported and spaced from said first-mentioned longitudinally extending frame members 10 by means of upright stays 12. At the extreme forward end of the aeroplane is located a vertical plane 13 which swings or oscillates on pivot 14 journaled in the frame and is controlled by arms 15 connected with cable 16 running over pulleys 17 and having a length wound around drum 18 said drum being supported by a member 19 and rotated by hand-wheel 20. The vertical plane 21 is of smaller dimensions than the plane 13, and is suitably pivoted for lateral oscillation at the rear of the aeroplane, being connected with the drum 18 by means of a cable 22 running over pulleys 23. Thus, by reason of the fact that these cables both are controlled from the drum 18, the planes 12 and 21 may be moved or shifted in opposite directions to vary and control the lateral direction of flight.

At the forward portion of the machine, the frame members 10 carry a fixed laterally extending supporting plane 24 of trapezoidal form, and a similar plane 25 is positioned directly thereover and carried by members 11. Between the supporting planes 24 and 25 are located rectangular supplementary supporting planes 26, one on each side of the aeroplane, positioned between the planes 24 and 25, and the position of the planes 26 is such that the latter project laterally beyond the forward portions of said planes 24 and 25.

Aft of the aviator's space and carried by the members 11 is a fixed laterally extending supporting plane 27, similar in shape to planes 24 and 25, but reversely positioned, that is to say its wider end lies adjacent the wider end of plane 25. Beneath the plane 27 and carried by frame members 10 is another laterally extending supporting plane 28, but this lateral plane does not extend beyond the members 10. Vertically positioned and connecting the planes 27 and 28 at each side of the aeroplane are the vertical planes 29 which impart lateral stability to the aeroplane during flight. All of the fixed planes and frame members are reinforced by suitably arranged tie-wires or stays 30.

At the extreme rear end of the aeroplane, and pivoted at 31 is the rear control or elevating plane 32 which swings or oscillates up and down about the pivot 31, and by so controlling the plane 32 the elevation of the aeroplane, during flight, may be varied and controlled. The rear edge of the plane 32 is connected with one end of a cable 33 which extends over pulleys 34 and connects with the lever 35 mounted on bracket 36, thus by moving the lever forwardly in the direction indicated by the arrow in Fig. 1, the rear control plane 32 may be raised. The rear edge of the said control plane 32 has also connected thereto a cable 37 running over pulleys 38 and connecting with the lower end 39 of lever 35, said lever being pivoted at 40; thus by moving the lever 35 in a direction reverse to that indicated by the arrow in Fig. 1 the said elevating plane may be lowered and the elevation of the aeroplane is thus under complete control of the operator at all times.

Within the aviator's space is located a suitable seat 41 which is adjacent the controlling wheel 20 and lever 35. Immediately behind the forward supporting planes 24 and 25, and about the middle of the machine are located two propellers 42 and 43 which are carried by shafts 44 and 45, respectively. Said shafts carry sprockets 46 and 47 over which runs the crossed chain or belt 48, and thus by imparting rotative movement to either shaft the propellers are driven in opposite directions to propel the machine forward. However, in this instance, the shaft 44 carries a sprocket 49 over which a chain 50 runs and is driven from a suitable prime mover 51 which may be in the form of a high-speed internal combustion engine.

It is believed, from the foregoing description, that the operation and control of the machine will be apparent to those skilled in the art without further description of the same; and while I have herein described a specific embodiment of the invention for illustrating the principles thereof, it is to be understood that I do not limit myself to such embodiment but may resort to such modifications and arrangements of parts as fall within the scope of the invention as defined in the appended claims.

I claim:—

1. In an aeroplane, a frame, a pair of fixed superimposed planes at the forward end of said frame, the said planes being of equal length and width and having their lateral edges inclined forwardly and inwardly, superimposed planes at the rear portion of said frame, and the upper of said rear planes having its lateral edges inclined inwardly and rearwardly, substantially as described.

2. In an aeroplane comprising a frame having propelling and steering mechanism, superimposed spaced supporting planes at the forward end of said frame, said planes being of substantially trapezoidal shape and having their shortest longitudinal edges disposed forwardly, an intermediate plane arranged parallel with and between said first mentioned planes and being of a width equal thereto, and the said intermediate plane being of a width equal to that of the first mentioned plane and of a length equal to the longest side of said trapezoidal planes, substantially as described.

3. In an aeroplane comprising a frame having propelling and steering mechanism, superimposed spaced supporting planes in arrears of the propelling mechanism, the uppermost of said planes being of trapezoidal shape and having its longest edge disposed forwardly, and the lowermost of said planes being of rectangular shape and substantially smaller than said upper plane, and vertical planes connecting said superimposed planes, substantially as described.

In testimony whereof I affix my signature in presence of two witnesses.

JOHN WILLIAM BARCUS.

Witnesses:
C. EVERETT LANCASTER,
M. E. JONES.